US00RE34151E

United States Patent [19]

Murakami et al.

[11] E Patent Number: Re. 34,151

[45] Reissued Date of Patent: Dec. 29, 1992

[54] DOUBLE LINK TYPE SUSPENSION SYSTEM

[75] Inventors: Takuya Murakami, Atsugi; Toshihiko Kakimoto, Isehara, both of Japan

[73] Assignee: Nissan Motor Co. Ltd., Yokohama, Japan

[21] Appl. No.: 544,848

[22] Filed: Jun. 27, 1990

Related U.S. Patent Documents

Reissue of:

[64] Patent No.: 4,753,455
Issued: Jun. 28, 1988
Appl. No.: 71,906
Filed: Jul. 10, 1987

[30] Foreign Application Priority Data

Jul. 15, 1986 [JP] Japan ..... 61-166128
Jul. 15, 1986 [JP] Japan ..... 61-166129

[51] Int. Cl.[5] ..... B60G 3/06

[52] U.S. Cl. ..... 280/663; 280/675; 280/696

[58] Field of Search ..... 280/660, 663, 666, 673, 280/675, 688, 690, 691, 693, 695, 696, 698, 701

[56] References Cited

U.S. PATENT DOCUMENTS

| | | | |
|---|---|---|---|
| 2,876,018 | 3/1959 | Kishline | 280/667 |
| 3,630,303 | 12/1971 | Froumajou . | |
| 3,804,433 | 4/1974 | Scherenberg et al. | 280/696 |
| 4,372,418 | 2/1983 | Dangel | 280/667 |
| 4,377,298 | 3/1983 | Finn et al. | 280/667 |
| 4,538,759 | 4/1986 | Kami et al. . | |
| 4,538,831 | 9/1985 | Kami et al. . | |
| 4,570,969 | 2/1986 | Tsutsumi | 280/664 |
| 4,802,688 | 2/1989 | Murakami et al. . | |
| 4,810,002 | 3/1989 | Kakimoto et al. . | |
| 4,887,839 | 12/1989 | Yoshimoto . | |

FOREIGN PATENT DOCUMENTS

| | | | |
|---|---|---|---|
| 2475995 | 8/1981 | France . | |
| 58-47613 | 3/1983 | Japan . | |
| 59-96007 | 6/1984 | Japan . | |
| 60-135314 | 7/1985 | Japan . | |
| 60-234011 | 11/1985 | Japan | 280/690 |
| 62-120207 | 6/1987 | Japan | 280/666 |

*Primary Examiner*—Charles A. Marmor
*Assistant Examiner*—Karin Tyson
*Attorney, Agent, or Firm*—Ronald P. Kananen

[57] ABSTRACT

A double link type front suspension system for an automotive vehicle of the front engine front drive type or the four wheel drive type. The suspension system is comprised of upper and lower control arms adapted to connect a steering knuckle to a vehicle body. A shock absorber is disposed [generally vertical] so that its upper end [section] is connected to the vehicle body [while its] *and the* lower end [section] is [relatively rotatably] *pivotally* connected [to] *by way of a joint formed on the upper portion of* the knuckle *to either the knuckle itself or the lower end of an intermediate arm which is connected between the* upper [section is made around] *arm and the knuckle. The lower control arm is connected to the knuckle by way of a ball joint. A steering axis is defined by* a [straight] line (steering axis)] passing through [a] *the* ball joint [for connecting] *and the joint on the upper portion of* the knuckle [lower section and the lower control arm, thereby making possible to set the steering axis regardless of the upper control arm].

35 Claims, 7 Drawing Sheets

DOUBLE LINK TYPE SUSPENSION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a double link type suspension system, for example, in use for an automotive vehicle, and more [particulary] *particularly* to a double wish-bone type suspension system having upper and lower control arms and a shock absorber installed between a vehicle body [side] and a wheel [side].

2. Description of the Prior Art

In connection with automotive vehicles, a variety of double link type suspension systems have been proposed and put into practical use as disclosed, for example, in Japanese Patent Provisional Publication No. 59-96007 (referred hereinafter to as "the first prior art") and in Japanese Patent Provisional (First) Publication No. 60-135314 (referred hereinafter to as "the second prior art"). In a suspension system of the first prior art, an upper section of a knuckle is upwardly extended over a wheel [to form an upper end thereof, which upper end] *and* is connected through an upper control arm to a vehicle body. In a suspension system of the second prior art, an upper control arm is prolonged as compared with as usual, and a steering axis (kingpin axis) is set [relardless] *regardless* of the upper control arm.

[Now in] *In* order to obtain a suitable suspension geometry, the upper control arm of the double link type suspension system is required to [ensure a considerable] *have a given* length [and therefore] *under which it* cannot be [so] shortened.

The above-summarized prior arts will be discussed. In the case of the first prior art suspension system, the inboard end of the upper control arm is supported to a vehicle body while the outboard end of the same is connected to the upper end of the knuckle, and additionally the upper control arm cannot be shortened for the above-mentioned reason, thereby [allowing a] *causing the* wheel house to extend to the side of an engine compartment in accordance with the length of the upper arm. In addition, a shock absorber is disposed generally parallel with the upwardly extended knuckle upper section. Thus, the width of the wheel house is enlarged thereby to unavoidably minimize the width of the engine compartment. Particularly in this first prior art suspension system, since the knuckle *which is* disposed parallel with the shock [abosrber] *absorber* is turned together with the wheel during steering, a [sufficient] *relatively* wide space is necessary between them in order to prevent interference [therebetween] during turning of the vehicle. This particularly [enlarges] *increases* the width of the wheel house. Furthermore, the turning of the knuckle together with the wheel requires a ball joint *which has a* large [in height] dimension [for] *in the vertical direction to provide the* connection between the upper end of the knuckle and the upper control arm, [so that] *whereby* the height of the wheel house [is unavoidably] *tends to be* enlarged.

In the case of the second prior art suspension system, the distance between the upper and lower control arms is relatively small, variation of *the* camber angle and *the* caster angle due to assembly error of suspension *of the* system component parts [comes out in] *amounts to* a relatively high value. Additionally, such [camberangle] *camber* and caster [angle largely] *angles* change *markedly* depending upon vertical [swing] *displacement* of the upper and lower control arms. These [provide an insufficient controllability of vehicle] *changes tend to deteriorate the* steering *characteristics.*

SUMMARY OF THE INVENTION

An object of the present invention is to provide an improved double link type suspension system for a vehicle, adapted to increase freedom of selection of [loation] *the location* of the outboard end section of [an] *the* upper control arm by separating *the* elements [for setting a] *which determine the* steering axis and *the* elements [for setting] *via which the* camber angle[, thereby minimizing] *is set, and to minimize* the width and *the* height of [a] *the* wheel house [as much as possible to enlarge] *in a manner which enables* the width of [an] *the* engine compartment [located thereinside] *to be enlarged as much as possible,* while [setting] *enabling the* wheel alignment [suitable] *to be suitably set.*

Therefore, a double link type suspension system of the present invention is comprised of a knuckle for rotatably supporting a wheel of a vehicle. The lower section of the knuckle is movably connected to the outboard end section of a lower control arm by a joint, the inboard end section of the lower control arm being movably connected to the vehicle body [side]. A shock absorber is so provided that its upper end section is connected to a vehicle body [side] while its lower end section is [relatively movably] *operatively* connected to an upper section of the knuckle. The [shock absorber] *knuckle* is relatively rotatable [to the knuckle] around a straight line (steering axis) passing through the joint. An extension member is connected at its one end section with *the knuckle or* the shock absorber and at the other end with the outboard end section of an upper control arm whose outboard end section is connected to the vehicle body [side].

Thus, the steering axis corresponds to the straight line passing through both the joint between the knuckle lower section and the lower control arm outboard end section and another joint between the knuckle upper section and *one of the shock absorber and* the extension member lower end section, therefore the upper control arm can be situated regardless of the steering axis. Additionally, the component parts [turnable] *which turn* together with the wheel (tire) are limited to [ones] *those* located between both the joints, i.e., near an axle shaft of the wheel. Consequently, interference among the component parts, particularly between the extension member and the shock absorber, during steering can be [suppressed as much as possible] *minimized.* This allows the width of the wheel house [to become small thereby] to *be reduced and thus* enlarge the width of an engine compartment [upon] *Thus, in* combination with the [effect of no relation of] *absence of any relationship between* the upper control arm [to] *and* the steering axis [so that a ] , *permits the* point at which the upper control arm inboard end section is attached to the vehicle body [side is] *to be* situated near the side section of the vehicle body. Additionally, since the extension member does not turn with the knuckle during steering, the extension member and the upper control arm can be connected [with each other] by a joint using an elastomeric insulation bushing, thereby minimizing the height of the joint as compared with a ball joint. This lowers the [top level] *height* of the wheel house and therefore [of a] *the height of the* hood defining the engine compartment.

Furthermore, variation [of] *in* camber angle (determined depending upon both the upper and lower control arms) along with vertical movement of the wheel can be suppressed to a lower value, because the upper control arm [comes to no relation to] *has no fixed relationship with the* setting of the steering axis and therefore can be [prolonged] *lengthened* while [enlarging] *increasing* the distance between the upper and lower control arms by virtue of employing the extension member. This greatly contributes to *the appropriate* setting *of the* wheel alignment [appropriate].

BRIEF DESCRIPTION OF THE DRAWINGS

In the drawings, like reference numerals designate like elements and parts, in which.

DETAILED DESCRIPTION OF THE INVENTION

Figure 1:
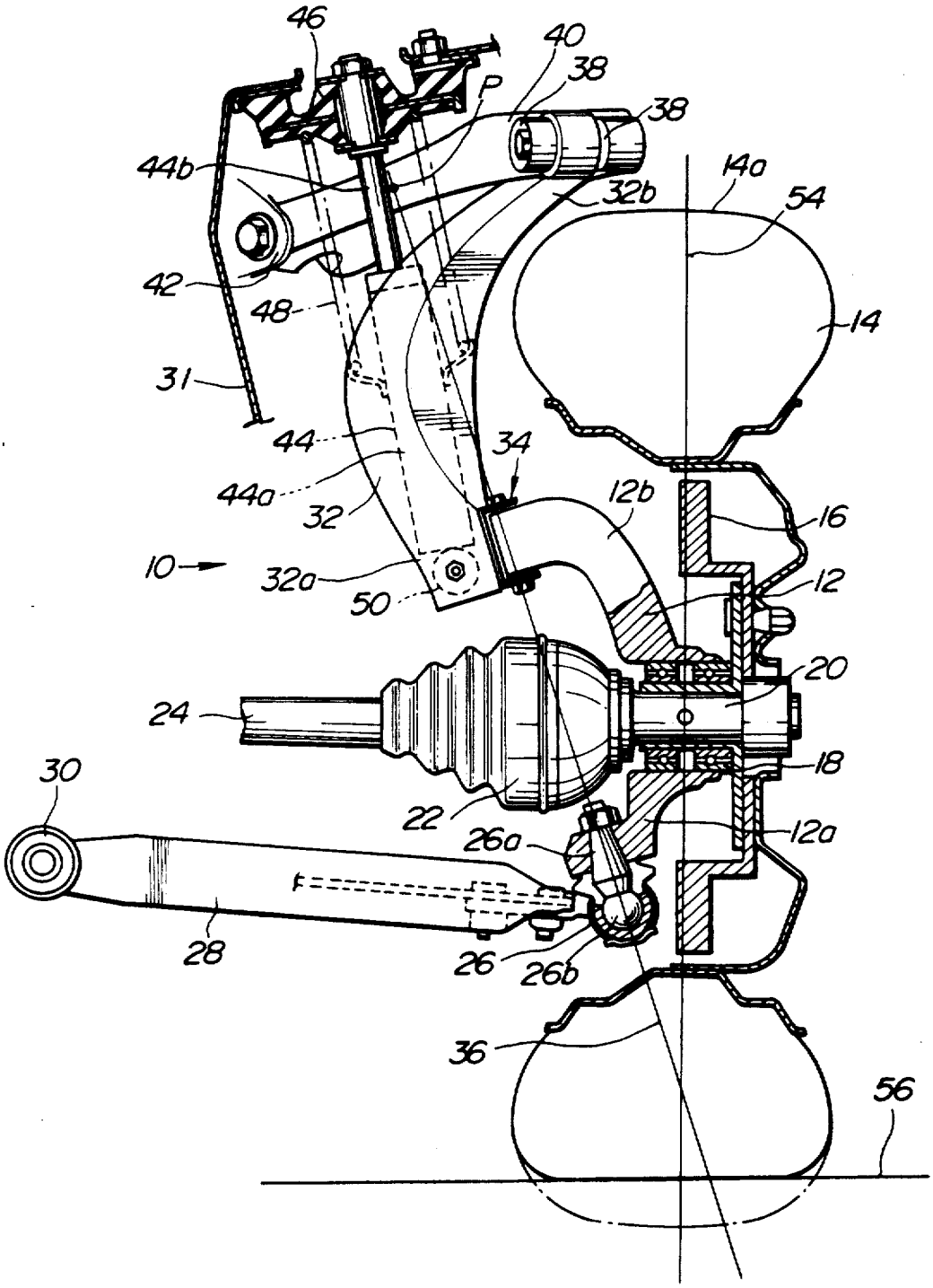
FIG. 1 is a fragmentary front elevation, partly in section, of a first embodiment of a double link type suspension system in accordance with the present invention.
Figure 2:
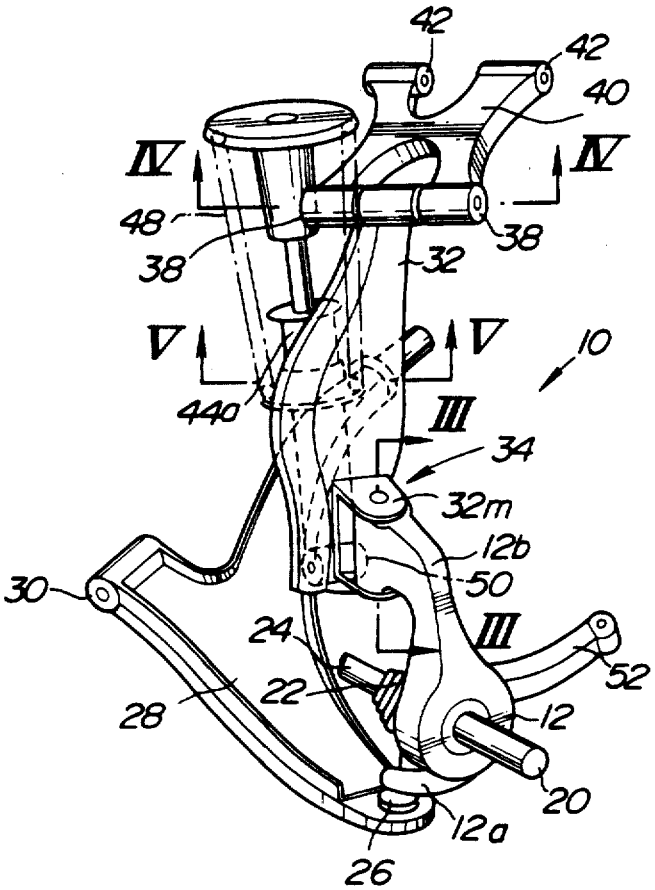
FIG. 2 is a schematic perspective view of the suspension system of FIG. 1 omitting a wheel.

Referring now to FIGS. 1 and 2, there is shown a first embodiment of a double link type suspension system 10 in accordance with the present invention. The suspension system 10 of this embodiment is a front suspension system of the double wish-bone type and is used for an automotive vehicle of the type wherein a driving force from an engine (not shown) is transmitted to front wheels (only one wheel 14 shown), for example, the front engine front drive (FF) type or the four wheel drive (4WD) type. The suspension system 10 is comprised of a steering knuckle 12 for rotatably supporting the front wheel 14 provided with a brake disc 16. The knuckle 12 rotatably journals through bearings 18 [an] *on* axle shaft 20 of the wheel 14 which shaft 20 is connected through a constant velocity joint 22 to a drive shaft 24 driven under the driving force from the engine.

The lower section 12a of a knuckle 12 is connected through a ball joint 26 to the outboard end section of a lower control arm 28 whose inboard end section is connected through a rubber (elastomeric) insulation bushing 30 to a bracket (not shown) of a vehicle body 31. The ball joint 26 includes a ball stud 26a secured to the knuckle lower section 12a, and a retainer 26b which is secured to the outboard end section of the lower control arm 28. The upper section 12b of the knuckle 12 rotatably connected to an extension bracket (member) 32 by a joint 34.

Figure 3:
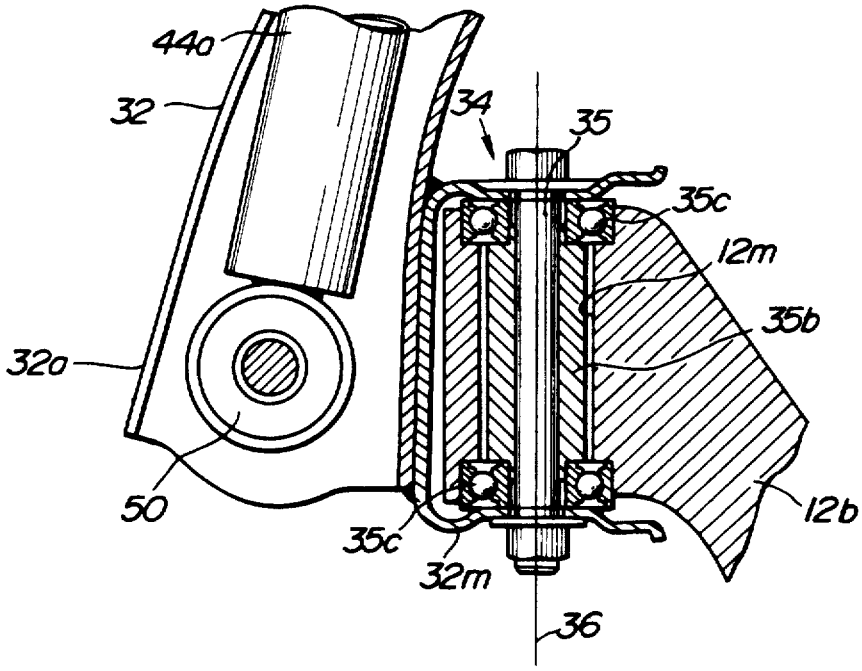
FIG. 3 is an enlarged sectional view taken in the direction of arrows substantially along the line III—III of FIG. 5.

As best shown in FIG. 3, the joint 34 between the extension bracket lower end section 32a and the knuckle upper section 12b includes a joint bracket 32m which is secured to the lower end section 32a of the extension bracket 32 and has a generally C-shaped cross-section so as to have spaced and opposite plate sections (no numerals) which are respectively formed with openings (no numerals). The upper section 12b of the knuckle 12 extends upward and [curved] *curves* inward of the vehicle body in such a manner that the tip end portion thereof is situated between the opposite plate sections of the joint bracket 32m. The tip end portion of the knuckle upper section 12b is formed with a vertical through-hole 12m. A bolt 35a is disposed so as to pass through the openings of the joint bracket opposite plate sections and the through-hole 12m. A cylindrical sleeve 35b is fitted on the bolt 35a and situated within the through-hole 12m. Two [rolling] *roller* (ball) bearings 35c are securely disposed spaced from each other and between the tip end portion of the knuckle upper section 12b and the sleeve 35b. Accordingly, the knuckle upper section 12b is relatively rotatable *with respect* to the extension bracket lower end section 32a. The axis of rotation of the joint 34 (i.e., the axis of the bolt 35a) is aligned with the axis of the ball stud 26a of the ball joint 26 to form a steering axis (kingpin axis) 36, so that relative rotation between the knuckle upper section 12b and the extension bracket lower end section 32a is made around the steering axis 36. Since the joint 34 is adapted to connect the knuckle upper section 12a and the[.] extension bracket lower end section 32a in such a manner that the knuckle upper section 12a is relatively rotatable to the extension bracket lower end section 32a around the steering axis 36, it will be understood [tht] *that* the [rolling] *roller* bearings 35c may be replaced with sliding bearings. Additionally, although the joint 34 has been shown and described as using the [rolling] *roller* bearings 35c, it will be appreciated that the joint may be replaced with other means for relatively rotatably connecting the knuckle 12 and the extension bracket 32 in a condition in which the axis of rotation of the joint is aligned with the steering axis 36.

The extension bracket 32 is extended upward and curved outward relative to [he] *the* vehicle body 31 generally in a manner to surround the upper section of the wheel 13 so that the upper end section 32b of the extension bracket 32 reaches a position above the uppermost section 14a of the wheel 14. The extension bracket upper end section 32b is [swingably] *pivotally* connected through rubber (elastomeric) insulation bushings 38 to the outboard end section of an upper control arm 40 whose inboard end section is [swingably] *pivotally* connected through rubber (elastomeric) insulation bushings 42 to a bracket (not shown) of the vehicle body 31. It will be understood that the joint between the extension bracket 32 and the upper control arm 40 is sufficient to be one using the rubber insulation bushing 38 because the extension bracket 32 is merely [swingable] *pivotal* relative to the upper control arm 40.

Figure 4:
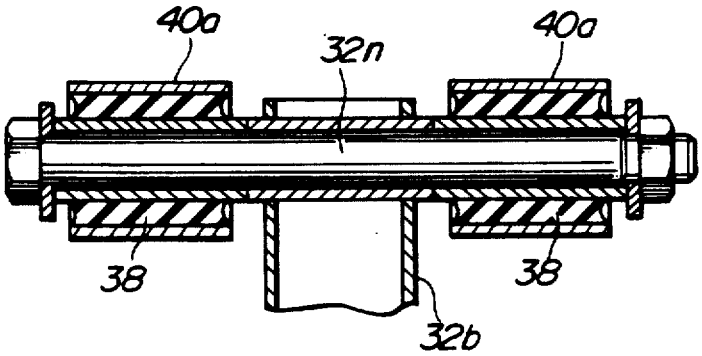
FIG. 4 is an enlarged sectional view taken in the direction of arrows substantially along the line IV—IV of FIG. 2.

As best shown in FIGS. 2 and 4, the above-mentioned joint between the extension bracket upper end section 32b and the upper control arm outboard end section includes a generally horizontally extending rod member 32n secured to the tip end portion of the upper end section 32b of the extension bracket 32 in such a manner that the tip end portion is positioned at the axially central part of the rod member 32n. The two rubber insulation bushings 38 are cylindrical and securely mounted on the rod member 32n, and located spaced from each other and on the opposite sides of the tip end portion of the extension bracket upper end section 32b. The upper control arm 40 is formed at its outboard end section with two cylindrical portions 40a which are spaced from each other and securely mounted respectively on the rubber insulation bushings [38A, 38B] *38, 38*. Accordingly, relative [swinging] *pivotal* movement between the extension bracket upper end section 32b and the upper control arm outboard end section is made under distortion of the rubber insulation bushings 38.

Figure 5:
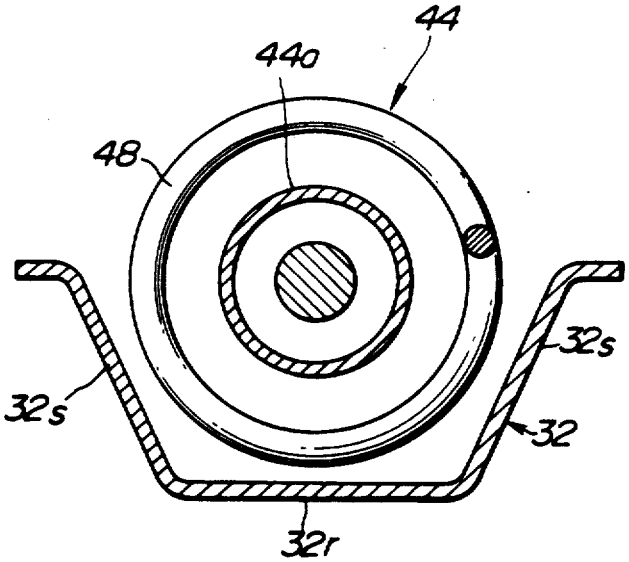
FIG. 5 is an enlarged sectional view taken in the direction of arrows substantially along the line V—V of FIG. 2.

A shock absorber 44 is [provided] *arranged* to extend generally parallel with the extension bracket 32 and *is* generally vertically installed between the vehicle body 31 and the lower end section 32a of the extension bracket 32. The shock absorber 44 includes an outer tube 44a whose lower end section is connected through a rubber (elastomeric) insulation bushing 50 to the lower end section 32a of the extension bracket 32. A piston rod 44b extending from the outer tube 44a is connected through a mount rubber 46 to the vehicle body 31. Additionally, a coil spring 48 is disposed coaxially with the shock absorber 44 and installed between the mount rubber 46 and the shock absorber outer tube [44a] *32a*. In this connection, the extension bracket 44 is constructed of press-formed sheet metal and formed generally channel-shaped to have a generally C-shaped cross-section as clearly shown in FIG. 5. Thus, the extension bracket [44] *32* includes an elongate base section 32t, and two side sections 32s which are integral with the base section 32r and located opposite to each other, thereby defining an elongate space in which at least a part of the shock absorber outer cylinder 44a and the coil spring 48 is situated. Accordingly, the extension bracket 44 covers the outer side (near the wheel 14) of the shock absorber outer tube 44a and the [lowe-half] *lower half* of the coil spring 48 in such a manner as to surround the shock absorber 44 and the part of the coil spring 48. As seen from FIG. 5, about half the outer periphery of the shock absorber 44 and the coil spring 48 is covered with the extension bracket 32. It will be understood that the generally [channel-shaped] *channel shaped* extension bracket 32 [offers a higher] *exhibits increased structural* strength [to the extension bracket itself while allowing to narrow] *and allows* the distance between the shock absorber 44 and the wheel 14 [thereby] *to be reduced in a manner which tend* to minimize the space occupied by [them] *the same*. The reference numeral 52 in FIG. 2 denotes [an] *a* knuckle arm which is connected to a steering linkage (not shown) through which a steering force or effort is transmitted to the knuckle 12.

[Thus, in] *In* this embodiment, a center line 54 of the wheel 14 (in the direction of width of the wheel in a cross-section including the axis of rotation of the wheel) crosses the steering axis 36 at a position above a horizontal plane 56 at which the wheel (tire) 14 is in contact with the ground or road surface as illustrated in FIG. 1. Furthermore, the steering axis 36 intersects the plane 56 at a position lying outward of the wheel center line 54 thereby to set *a* so-called negative scrub radius. It is to be noted that since the steering axis 36 is determined by locations of both the joint between the knuckle 12 and the extension bracket 32 and the joint between the knuckle 12 and the lower control arm 28, setting the scrub radius positive, negative or zero is [not related] *unaffected by* to the arrangement of the upper control arm 40. Consequently, the rubber insulation bushing 38 between the upper control arm 40 and the extension bracket 32 can be located without any [restraint from the] *consideration of the orientation of* steering axis 36. In this connection, in this embodiment, the rubber insulation bushings 38 are located above the wheel 14 so as to project outward relative to the vehicle body so that the rubber insulation bushings 38 and the wheel 14 overlap each other in the direction of width of the vehicle. This [ensures a sufficient length of] *enables* the upper control arm 40 to *be long enough to* obtain [an optimum] *optimal* wheel alignment while locating the inboard end section of the upper control arm 40 at a position near the outside of the vehicle in the direction of width of the vehicle. It will be understood that this [a reason] *one of the reasons* why the width of a wheel (tire) house is minimized thereby to enlarge the width of [an] *the* engine compartment.

[Thus, ensuring] *By increasing* the [sufficient] length of the upper control arm 40 [minimizes] *it is possible to reduce* the difference in length between the upper and lower [contol] *control* arms 40, 28 [thereby making possible to obtain the optimum] *thus facilitating optimal* wheel alignment. Additionally, since the vertical distance between the upper and lower control arms 40, 28 can be enlarged, variation of *the* camber [angle] and caster [angle] *angles* due to assembly error [of the suspension component parts] can be minimized while suppressing development of variation of the camber angle during vertical movement of the wheel 14. Additionally, the rigidity of [both] the arms 40, 28 increases proportional to the square of the distance between [the both] the arms, and therefore the rigidity of [them is enlarged] *of the same is increased* thereby improving the marginal performance of camber angle variation (*Viz., reduce marginal variations in camber angle*).

As *will be* appreciated, the weight of the vehicle body is supported by the wheel 14 through the mount rubber 46, the coil spring 48, the shock absorber outer tube 44a, the lower control arm 28 and the knuckle 12. The vertical movement of the wheel 14 can be damped [under] *by* expansion and contraction of the shock absorber 44 and absorbed under deflection of the coil spring 48. [Here, during] *During* vertical movement of the wheel 14, the knuckle 12 and the extension bracket 32 make their vertical movement together with the wheel 14, so that the lower and upper control arms 40, 28 [swing] *pivot* vertically. Along with this, the shock absorber 44 and the coil spring 48 make their expansion and contraction. Thus, since all such members make their vertical movement, no interference occurs between a section including the knuckle upper section 12b and the extension bracket 32 and another section including the shock absorber 44 and the coil spring 48.

It will be understood that when steering force or effort is transmitted from the steering linkage through the knuckle arm 52 integral with the knuckle 12, the knuckle 12 makes its rotation around the steering axis 36 thereby to turn the wheel 14 to steer the vehicle. At this time, the knuckle 12, wheel 14 and the axle shaft 20 turn around the steering axle 36 in which the knuckle 12 is rotatable at the joint 34 and therefore the extension bracket 32 does not turn. As a result, since the extension bracket 32 makes only the above-mentioned vertical movement along with the wheel 14 so that its relative movement to the upper control arm 40 is only [swinging] *pivoting*, a ball joint is unnecessary for the joint between the extension bracket 32 and the upper control arm 40, so that the rubber insulation bushings 38 are sufficient for this joint. The rubber insulation bushings 38 are smaller in height dimension than the ball joint, and consequently the height of the wheel house is minimized thereby lowering the level of the hood of the engine compartment. In this connection, the rubber insulation bushing is smaller by about 40 mm in height dimension than the ball joint usually used for a control arm of a double wish-bone type suspension system.

Furthermore, the fact that no rotation is [made] *induced* in the extension bracket 32 during vehicle steering [leads to the fact of making no relative] *obviates* displacement of the shock absorber 44 and the coil spring 48 *with respect* to the extension bracket 32 [therby to prevent] *thereby preventing* interference therebetween. In this connection, the extension bracket 32 [is formed] *has a* channel-shaped or C-shaped [in] cross-section thereby [surrounding] *partially enclosing* the shock absorber 44 and the coil spring 48. This extremely [minimizes] *reduces* the distance between the shock absorber 44 and the wheel 14, thus making possible to minimize the width of the wheel house thereby to enlarge the width of the engine compartment, in combination with the fact that freedom of location of the upper control arm 40 increases. It will be understood that, in this case, the shock absorber 44 and the coil [sprung] *spring* 48 are prevented from being [injured with spring stone] *damaged by flying stones* and the like since the shock absorber cylinder 44a and the coil spring lower part are covered or protected with the extension bracket 32.

Moreover, during vehicle starting or braking, *the* relative displacement force developed between the vehicle body 31 and the wheel 14, acts along an extension of the steering axis 36 on the upper control arm 40. In other words, the relative displacement force is [input] *applied* to a point P positioned midway between the inboard and outboard end sections of the upper control arm 40. Thus, such force input is made [to] *at* the position nearer to the vehicle body 31 than in a case in which the same force input is made to the outboard end section of the upper control arm 40, and therefore less load due to such force input is applied to a portion of the vehicle body 31 to which portion the inboard end section of the upper control arm 40 is attached. This makes *it* possible to lighten the weight of the vehicle body portion to which the upper control arm is attached, and minimize the size and soften the rubber insulation bushing 42 used in the joint between the upper control arm 40 and the vehicle body 31. Such softening *of* the rubber insulation bushing leads to an increase in absorption efficiency [for] *of* vibration input from the side of the wheel 14, thus reducing vehicle vibration and booming noise due to the vibration.

While the above-discussed embodiment has been shown and described to be so arranged that the lower end section of the shock absorber 44 is connected to the knuckle upper section 12a so that the weight of the vehicle body is not supported by the lower control arm 28 thereby to minimize the rigidity of the lower control arm 28 and the rubber insulation busing 30 and enlarge the space around the drive shaft 24, it will be appreciated that the lower end section of the shock absorber 44 may be supported [to] *on* the lower control arm 28 in which a considerable part of the shock absorber 44 is covered with the extension bracket 32 as discussed above.

As a result, the suspension system of the present invention offers jointly both the advantageous effects of the above-discussed first and second prior arts as shown in Table 1, and additionally offers the unique advantageous effects [summerized] *summarized* as follows:

(1) Since the extension member (bracket) does not turn during vehicle steering, it is possible to use the rubber insulation bushing in the joint between [the] *an* upper control arm and the extension member, thereby minimizing the height of the joint as compared with the case of using a ball joint. This minimizes the height of the wheel house thereby lowering the hood of the engine compartment.

(2) Since the relative displacement force developed between the vehicle body and the wheels during vehicle starting and braking is input to the upper control arm at a position lying on the extension of the steering axis, the [thus input] force is applied to a location nearer to the vehicle body than in the case where the same force is input to the outboard end of the upper control arm. Accordingly, less load [due to the above-mentioned input force] is applied to the arm attaching portion of the vehicle body, thereby making possible weight-lightening of the vehicle body arm attaching portion and [minimizing and] softening of the joint. Such softening of the joint suppresses vibration transmission to the vehicle body [threby] *thereby* to reduce booming noise due to the vibration transmission.

(3) Since setting of the steering axis can be accomplished [regardless] *irrespective of the location and orientation* of the upper control arm, the attaching location of the upper control arm to the vehicle body can be situated outward in the direction of the vehicle body width, so that the *location of* outboard end of the upper control arm is freely [selectable] *variable*. Thus, the width of the engine compartment is enlarged in combination with the above-mentioned reason. Additionally, it is [posible] *possible* to determine the length of the upper control arm [appropriate] to obtain a suitable wheel alignment.

Figure 6:
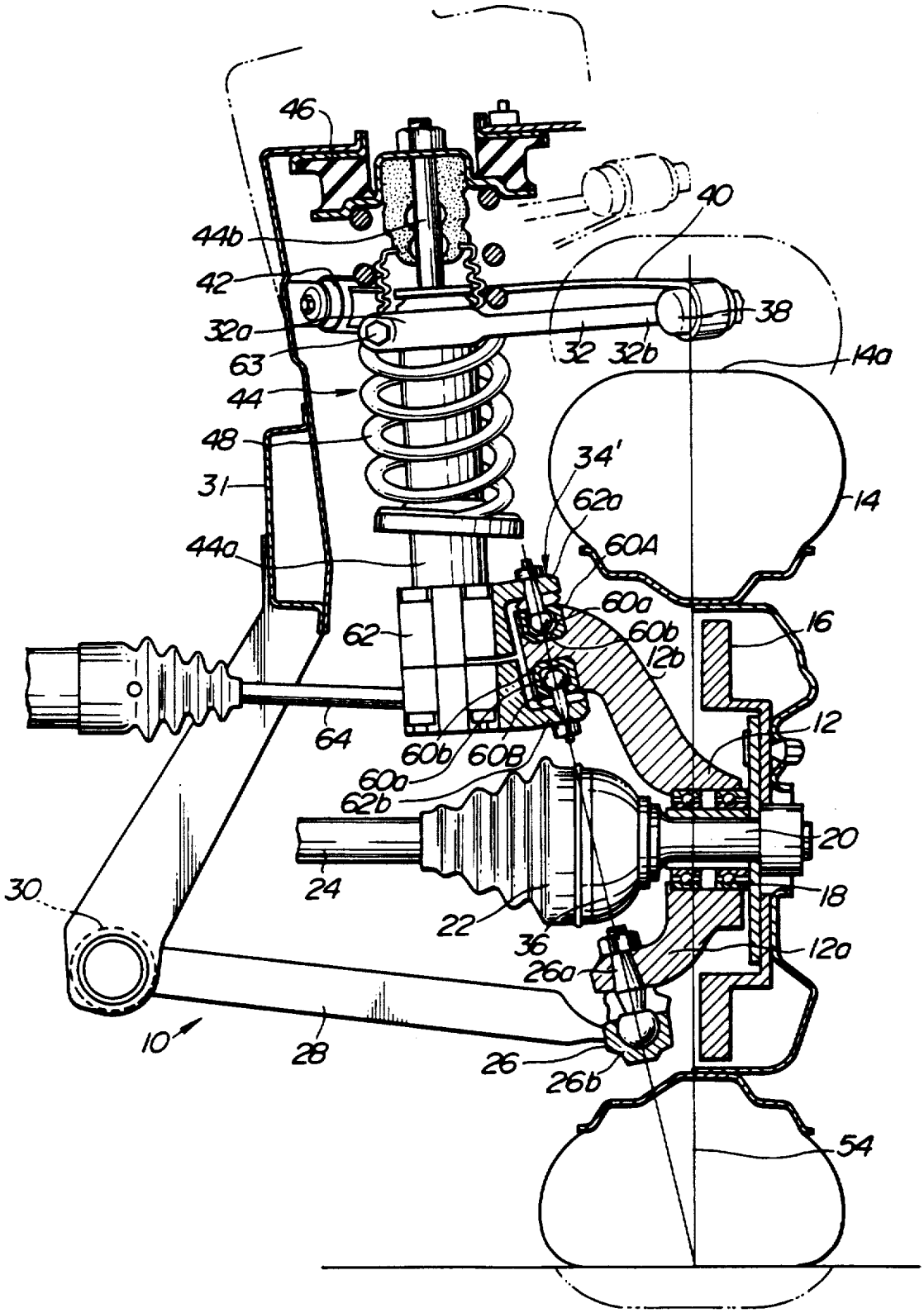
FIG. 6 is a fragmentary front elevation, partly in section, of a second embodiment of the suspension system in accordance with the present invention.

FIG. 6 illustrates a second embodiment of the suspension system in accordance with the present invention, which is similar to the first embodiment except for the joint 34' between the shock absorber 44 an the knuckle upper section 12b, and the extension member 32 for connecting the shock absorber 44 and the upper control arm 40. In this embodiment, the lower end section of the shock absorber cylinder 44a is rotatably connected through two ball joints 60A, 60B to the upper section 12b of the knuckle 12. More specifically, a bracket 62 is secured to the lower end section of the outer tube 44a is formed with upper and lower flange sections 62a, 62b which are spaced from each other. Each ball joint 60A (60B) includes a ball stud 60a and a retainer 60b for the ball joint. The two ball joints 60A, 60B are located opposite to and generally symmetrical with each other in such a manner that the respective axes of the ball studs 62a are aligned with each other. The two ball studs 60a are respectively secured to the upper and lower flange sections 62a, 62b, while the two retainers 60b are secured to the tip end portion of the knuckle upper section 12b which tip end portion is situated between the upper and lower flange sections 62a, 62b. As shown, the axis of rotation of the joint 34' (i.e., the common axis of the two ball studs 60a) is aligned with the axis of the ball stud 26a of the ball joint 26 thereby to form the steering axis (kingpin axis) 36. Accordingly, relative rotation between the knuckle upper section 12b and the shock absorber lower end section is made around the steering axis 36. It will be understood that a sufficient clearance is formed between the ball joint 26 and the brake disc 16 to prevent interference therebetween.

The extension bracket 32 is fixedly secured at its one end section to the upper section of the piston cylinder 44a of the shock absorber 44 by means of a bolt 63 and at the other end to a rubber (elastomeric) insulation bushing 38 to the outboard end section of the upper control arm 40. Accordingly, the joint (including the bushing 38) between the extension bracket 32 and the upper control member 40 is vertically [swingable] *pivotal* as indicated in phantom. The coil spring 48 is wound around the shock absorber 44 in such a manner that the extension bracket 32 is interposed between adjacent coiled wire portions, in which the pitch of the coiled wire portions is increased at a position at which the extension bracket 32 is situated thereby to prevent interference between the coil spring 48 and the extension bracket 32 even during vertical [swing] *pivot* of the upper control arm owing to vertical movement of the wheel 14 or during contraction of the coil spring 48. It will be understood that interference between the coil spring 48 and the upper control arm 40 may be prevented in a similar manner if there is a possibility of interference therebetween. The reference numeral 63 denotes a tie rod of the steering linkage.

Thus, in this embodiment, the steering axis 36 crosses the wheel center line 54 at a point on the plane 56 at which the wheel 14 is in contact with the road surface, thereby providing zero scrub radius. It will be understood that the steering axis 36 is determined by a [locational] *spatial* relationship between the ball joint 26 and the ball joints 60A, 60B, and therefore the upper control arm 40 and the extension bracket 32 have no [concern] *effect* in making scrub radius negative, [possitive] *positive* or zero. Accordingly, the *steering axis does not influence the disposition of the* rubber insulation [bushing 38] *bushings 38, 38* in the joint [between] *interconnecting* the upper control arm 40 and the extension bracket 32 can be [situated without being restrained from the steering axis 36, and therefore it is] located [just] *in a laterally outward position* above the wheel 14 [and outward relative to he vehicle body so tht the bushing 38 and the wheel 14 are overlapped in the width direction of the vehicle] , thus ensuring a sufficient . *This enables the* length of the upper control arm 40 *to be set so as* to provide appropriate wheel alignment and [locating] *locate* the outboard end section of the upper control arm 40 at a position near the outside of the vehicle body in the vehicle width direction. It will be understood that this [is a reason for reducing] *feature enables* the width of the [wheel (tire)] *tire* house [thereby to enlarge] *to be reduced and* the width of the engine compartment [and the like inside the wheel house] *to be correspondingly increased*. Since the rubber insulation bushing 38 is situated just above the wheel 14, the upper control arm 40 and the shock [abosrber] *absorber* outer tube 44a are connected by the extension bracket 32, while force input in fore-and-aft and lateral directions of the vehicle is supported by the upper control arm 40 and the lower control arm 28.

Additionally, since the shock absorber 44 is disposed between the knuckle upper section 12b and the vehicle body 31 so that the shock absorber outer tube 44a serves also as an upwardly extending portion of the knuckle 12, only the shock absorber 44 and the coil spring 48 are so disposed as to vertically extend [on at a location] inward of the inside of the wheel 14 within the wheel house. It will be understood that this is also a reason for reducing the width of the wheel house thereby to enlarge the width of the engine compartment [inside the wheel house].

Upon movement of the tie rod 64 of the steering linkage, the wheel 14 is turned together with the knuckle 12 to steer the vehicle[, in which the turning of them is made] around the steering axis 36. Similarly, also upon vertical movement of the wheel 14, turning movement [not around] *other than about* the steering axis 36 [is] *does* not [developed] since the steering axis 36 passes through the ball joints 60A, 60B, 26.

Furthermore, the shock absorber outer tube 44a and the extension bracket 32 behave as a single member [with] *which is connected to the* unsprung members, and therefore variation of camber, toe-in and the like is determined by the upper control arm 40 and the lower control arm 28 [similarly in] *similar to* conventional wish-bore type suspension systems. The mount rubber 46 at the upper end of the shock absorber 44 receives horizontal force input from the shock absorber [owing] *in response* to movement of the upper control arm 40 and the lower control arm 28. This force input is [adapted] *such as* to [make] *induce* shearing [action to] *of* the mount rubber 46 and suppress inner stress and friction [of] *in* the mount rubber[, consequently. *Due to its configuration,* the mount rubber 46 [is low in] *exhibits a low* rigidity against force input in horizontal direction. [Additionally, against force input in vertical direction, the] *On the other hand,* shock absorber 44 and the coil spring 48 [work so that] *are arranged with respect to* the mount rubber 46 [has] *so that it exhibits* a high rigidity [under compression] against force input in vertical direction. Thus, vertical force input is [supported] *borne* by the shock absorber 44 and the mount rubber 46, and additionally *as* the shock absorber 44 is [supported] *connected* to the knuckle upper section 12b[. Consequently], the lower control arm 28 is not required to support the vertical force input and therefore no connecting member is provided between the shock absorber 44 and the lower control arm 28. This [enlarges a] *increases the* space around the bracket 62 of the joint between the shock absorber 44 and the knuckle upper section 12b, thereby increasing [freedom of] *the ease with which* pipings for a brake system (not shown) *can be disposed.*

When the wheel 14 bounds and the knuckle 12 moves upwardly, the coil spring 38 is compressed and the shock absorber outer tube 44a ascends thereby to cause [upwardly move] *upward movement of* the extension bracket 32 [to upwardly move], so that the upper control arm upwardly [swings] *pivots* to a position indicated in phantom in FIG. 6. Thus, since the upper control arm 40 behaves [like] *in the same manner* the wheel 14 [along with the] *during* vertical movement of the wheel 14, no interference occurs between the wheel 14 and the upper control arm 40 and the extension bracket 32.

Figure 7:
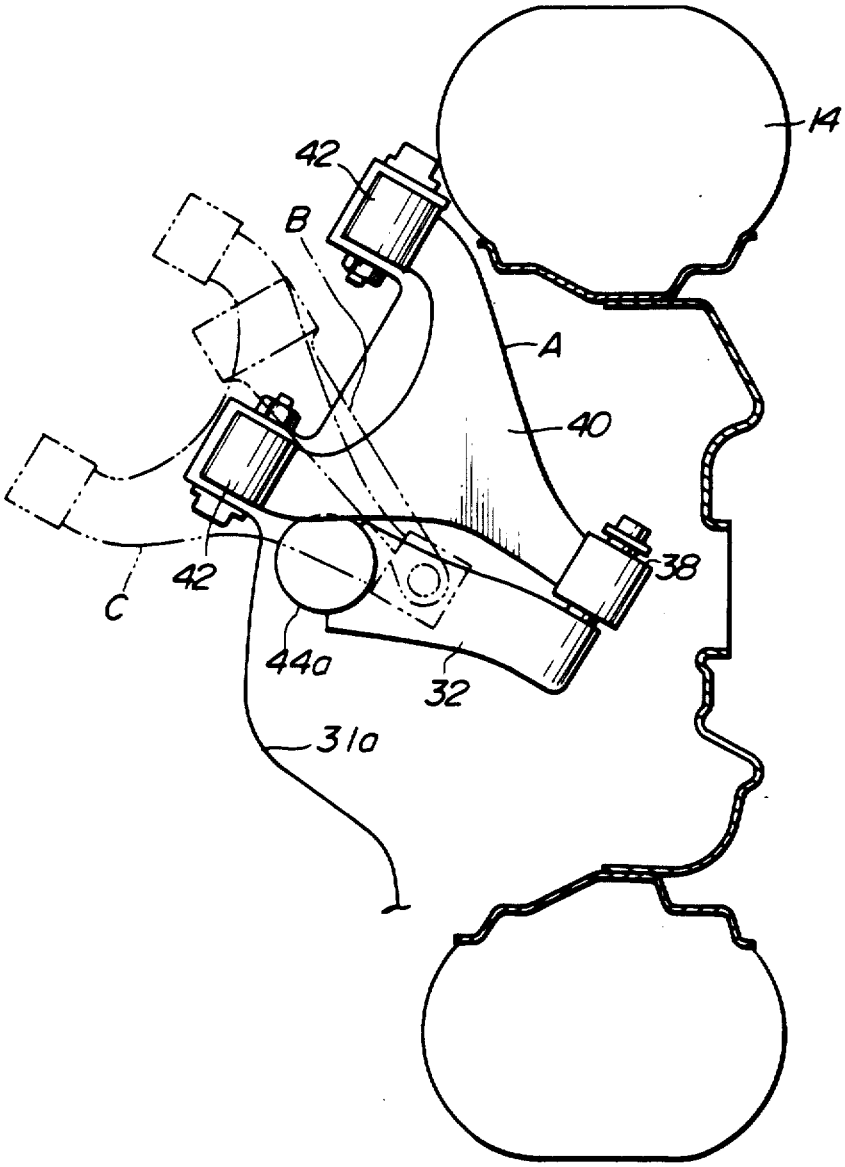
FIG. 7 is an illustrative plan view showing the [locational] *spatial* relationship among component parts of the suspension system of the present invention on comparison with those of similar conventional suspension systems.

FIG. 7 shows a [locational] *spatial* relationship [among] *which exists between* the wheel 14, the upper control arm 40, the extension bracket 32 and the shock absorber outer tube 44a as viewed from the upper side of the wheel 14. The [locational] *spatial* relationship indicated in solid lines and by the character "A" corresponds to that of the second embodiment of FIG. 6. Other [locational] *spatial* relationships indicated in phantom and by the characters "B" and "C" correspond to examples in which the outboard end section of the upper control arm is merely connected to the shock absorber outer tube without using the extension bracket. As is appreciated from FIG. 7 employing the extension bracket 32 [facilitates to allow] *permits* the width of the wheel (tire) house defined by a vehicle body wall 31a to a minimized thereby ensuring a required length of the upper control arm, as compared with cases of "B" and "C" shown in phantom.

Figure 8:
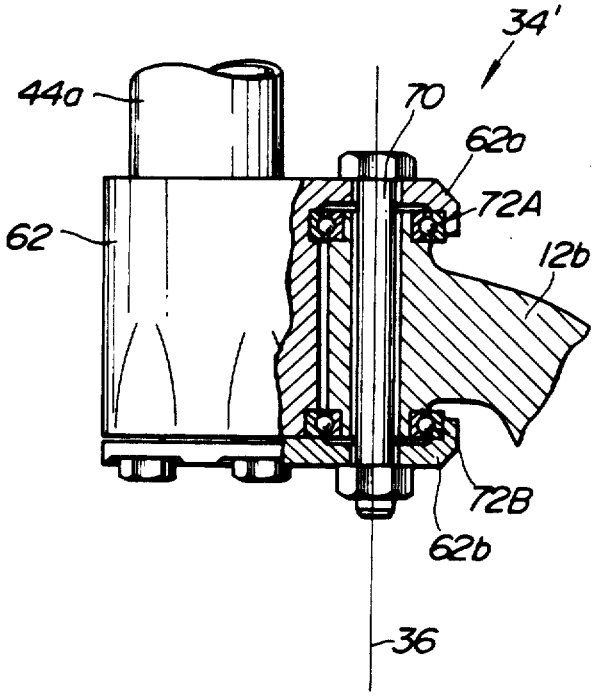
FIG. 8 is a fragmentary front elevation, partly in section, of a modified example of a joint for connecting a steering knuckle and a shock absorber, used in the suspension system of FIG. 6.

FIG. 8 shows a modified example of the joint 34' between the shock absorber outer tuber 44a and the knuckle upper section 12b. This joint 34' is similar to that used in the second embodiment of FIG. 6 with the exception that [rolling] *roller* bearings are used in place of the ball joints. In this example, the joint 34' includes the bracket 62, to which the lower end section of the shock absorber outer tube 44a is fixedly secured, *which* is formed with opposite and spaced flange sections 62a, 62b which are respectively formed with openings (no numerals). The tip end portion of the knuckle upper section 12b is situated between the flange sections 62a, 62b and formed with a through-hole (no numeral), in which a bolt 70 passes through the openings of the flange sections 62a, 62b and the through-hole of the tip end portion of the knuckle upper section 12b. Additionally, two annular ball bearings 72A, 72B are disposed spaced and coaxial between the bracket 62 and the tip end portion of the knuckle upper section 12b so as to allow smooth relative rotation therebetween. In this example, the axis of rotation of this joint 34' (i.e., the axis of bolt 70) is aligned with the steering axis 36.

Figure 9:
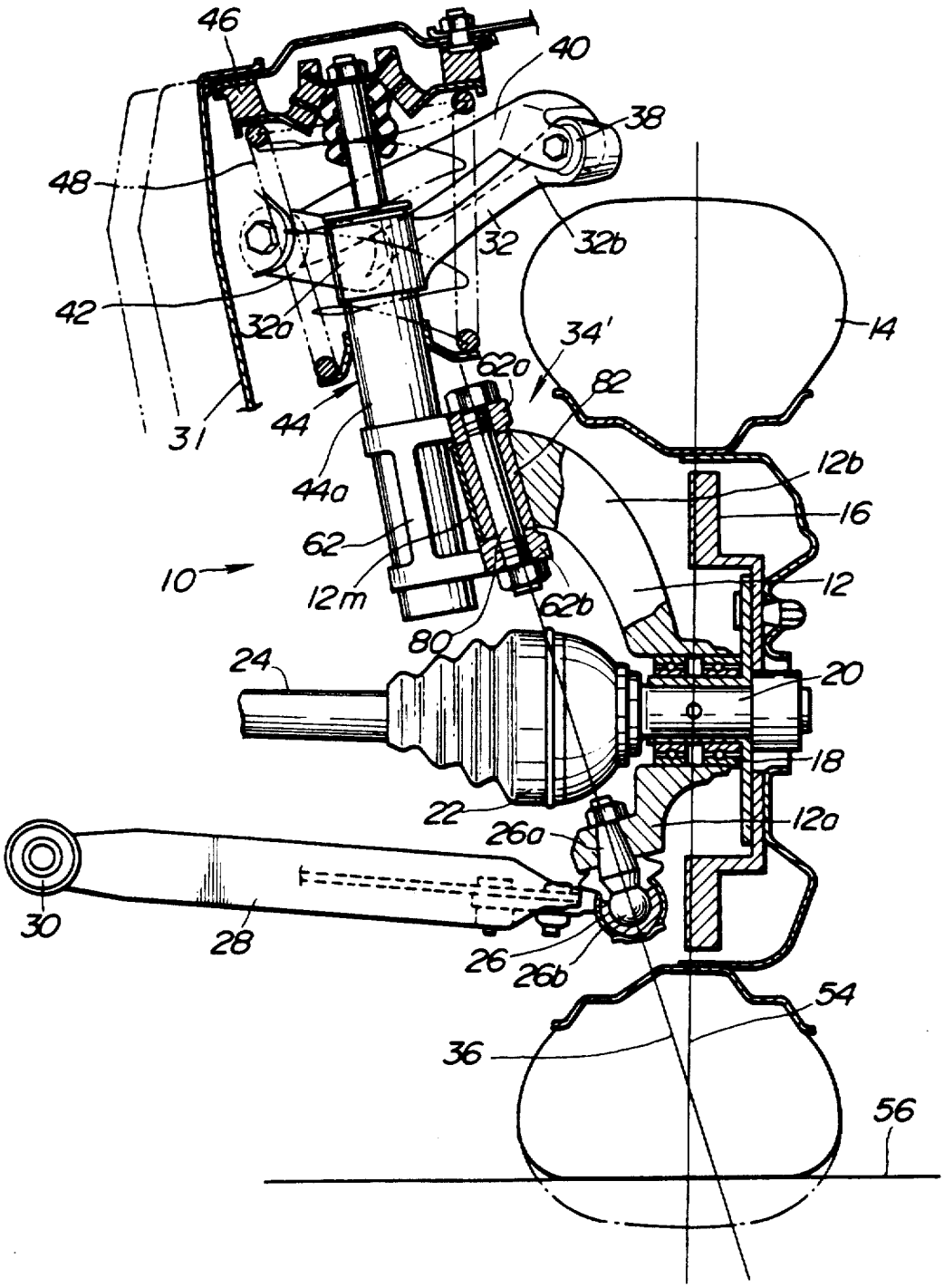
FIG. 9 is a fragmentary front elevation, partly in section, of a third embodiment of the suspension system in accordance with the present invention.

FIG. 9 illustrates a third embodiment of the suspension system according to the [preent] *present* invention, which is similar to the second embodiment except for the [deail] *detail* of the joint 34', the extension bracket 32 and the coil spring 48. In this embodiment, the knuckle upper section 12b is formed with a cylindrical portion 12m which is positioned between two flange sections 62a, 62b of the bracket 62 to which the lower end section of the shock absorber outer tube 44a is secured. The flange sections 62a, 62b are located spaced from each other and formed respectively with openings (no numerals). The cylindrical portion 12m of the knuckle upper section 12b is slidably rotatably mounted on a bolt 80 through a cylindrical plastic bushing (sliding bushing) 82. The bolt 80 is secured to the bracket 62 in such a manner as to pass through the openings of the flange sections 62a, 62b. Accordingly, the [shock absorber outer tube 44a is relatively rotatable to the knuckle] upper section 12b *of the knuckle is connected to the shock absorber outer tube 44a* by the joint 34' [whose] *so as to be rotatable abut the* axis of rotation *thereof* ([i.e.] *viz.*, the axis of the bolt 80) *which axis* is aligned with the steering axis 36 [passing] *and which passes* through the axis of the ball joint 26.

The lower end section of the extension bracket 32 is formed into the cylindrical shape and fitted on the outer tube 44a of the shock absorber 44. Additionally, the coil spring 48 disposed around the shock absorber 44 is tapered downwardly in order to facilitate *connection* to [secure] the lower end thereof to the outer tube 44a of the shock absorber 44. The pitch of the coiled wire portions of the coil spring 48 is enlarged at a section through which the extension bracket 32 extends, in order to prevent interference between the coil spring 48 and the extension bracket 32 [like in] *similar to* the second embodiment of FIG. 6. As seen from the Figure, in this embodiment, the steering axis 36 crosses the wheel center line 54 at a position above the plane at which the wheel (tire) 14 is in contact with road surface thereby to provide negative scrub radius [like in] *similar to* the first embodiment of FIG. 1.

While only the front suspension systems for the vehicles of the front engine front wheel drive type or the four wheel drive type have been shown and described, it will be understood that the principle of the present invention may be applicable to other suspension systems such as a front suspension system for a vehicle of the front engine rear wheel drive type.

TABLE 1

| Feature [in] [arrangement] | Item | Effect | Evaluation of effect: Present invention | First prior art | Second prior art |
|---|---|---|---|---|---|
| [A case an] *The* upper arm is located at a [higher] *high* position as in the first prior art | Assembly accuracy | Since the distance between *the* upper and *the* lower control arms is large, variation of camber angle and caster angle due to assembly error is small. | A | A | D |
| | Rigidity against camber angle variation | Since the distance between both control arms is large, rigidity against variation of camber angle is large. In other words, the rigidity increases proportional to the square of the distance between [both] the control arms. (As a result, marginal performance of camber angle variation is high). | B | B | D Note 1) |
| | Force input to upper control arm | Since the distance between [both] *the* control arms is large, force input to *the* vehicle body is small relative to lateral and fore-and-aft direction forces and the like at a ground-contacting plane of *the* tire. As a | B | B | D Note 1) |

TABLE 1-continued

| Feature [in] [arrangement] | Item | Effect | Evaluation of effect: Present invention | First prior art | Second prior art |
|---|---|---|---|---|---|
| | | result. rigidity of *the* upper control arm can be minimized thereby to weight-lighten it and lower production cost. | | | |
| | Variation of camber angle | Since the distance between [both] *the* control arms, *almost no* camber angle variation is [hardly] developed even under vibration of both the control arms. | B | B | D |
| | Adaptation for FF vehicle | An FF vehicle requires a drive shaft for *the* front wheels, and therefore there is no space for *the* upper control arm [inside a] *in board of the* road wheel. | A | A | D |
| [A case] *The* upper control arm is [longer] *lengthened*, and *the* steering axis is set [relardless] *regardless* of the upper control arm as in the second prior art | Variation of camber angle | Since *the* upper control arm is [longer so as to be small] [in] *long and reduces the* difference between it and *the* lower control arm, [evariation] *variation* of camber angle is [made smaller] *reduced.* | A | D | A |
| | Space in vehicle body frame (1) | Since *the* upper control arm can be projected outward of vehicle body, the width of engine compartment is enlarged. | B | D | B |
| | Space in vehicle body frame (2) | Since *the* upper control arm is [longer] *long*, the [distance of entering] *amount of entry* of tire upper-most section into vehicle body is smaller during bound, the width of engine compartment can be enlarged. | B | C | B |
| | Jack-down | During vehicle turning, displacement amount of both control arms is [smaller] *reduced*, and tendency of down-force development is [smaller] *reduced.* | B | D | B |
| [A case a] *The* steering axis is set regardless of *the* upper upper control arm, and the upper control arm is [longer] *lengthened*, [and] situated at a higher position and disposed near the outside of *the* vehicle | Space in vehicle body frame (3) | [There] *As there* is no relative displacement between *the* extension bracket and *the* shock absorber, it is possible to narrow the space therebetween. Accordingly, the width of *the* engine compartment is enlarged. | A | D | C Note 3) |
| | Height of Hood from the ground | Since *the* extension bracket does not turn, the joint between *the* upper control arm outboard end and *the* extension bracket [is sufficient to employ] *can be a* bushing. Consequently, the height [dimention] *dimension* of the joint is minimized as compared with in the case of ball joint, thereby lowering wheel house by about 40 mm. | A | D | C Note 2) |
| | Force Input during braking and starting | Force input to *the* upper control arm is made at a point P in the drawing but not at the outboard end (pivot point), and it is possbile that force input to *the* vehicle control arm attaching portion is minimized, *the* vehicle body is weight-lightened, and *the* bushing is small-sized (improving durability) and softened (improving noise and vibration absorption effect). | B | D | D |
| | Length of upper control arm | If the [vehicle body side] *inboard* pivotal position of *the* upper control arm is sufficiently projected outward of *the* vehicle body in order to enlarge engine compartment, freedom of selection of the position of *the* bushing at the contro arm outboard end section is [larger] *increased*, thereby [ensuring] *permitting* a | A | D | C Note 3) |

TABLE 1-continued

| Feature [in] [arrangement] | Item | Effect | Evaluation of effect: Present invention | First prior art | Second prior art |
|---|---|---|---|---|---|
| | | suitable length of the control arm. | | | |

Meaning of character for "Evaluation of Effect":
A . . . excellent
B . . . good
C . . . insufficient
D . . . no effect
Note
1) Chassis frame is necessary in connection with rigidity against camber angle variation.
2) There are no control arms and bushings located at [higher] *high* positions [at all].
3) Interference between upper control arm and an axle occurs if the upper control arm is *made* longer.

What is claimed is:

1. A double link type suspension system for a vehicle, comprising:

a knuckle for rotatably supporting a wheel of the vehicle;

a lower control arm having a first end section [movable] *pivotally* connected to a lower section of said knuckle by a first joint, and a second end section [movably] *pivotally* connected to [side of] a vehicle body;

a shock absorber having a first [end] section *which is* connected to the vehicle body [side], and a second [end] section [relatively movably] *operatively* connected to an upper section of said knuckle[,] *by way of a joint means in such a manner that* said [shock absorber being] *knuckle is* relatively rotatable [to said knuckle around] *with respect to said shock absorber about* a straight line passing through said first joint *and said joint means;* an extension member having a first end section*and a second end section, the first end section being* connected to *one of* said shock absorber[, and a second end section] *and said knuckle*; and an upper control arm having a first end section [movably] *pivotally* connected to the second end section of said extension member, and a second end section *pivotally* connected to the vehicle body [side].

2. A double link type suspension system as claimed in claim 1, wherein said shock absorber is disposed generally vertical and near said extension member.

3. A double link type suspension system as claimed in claim 1, wherein the vehicle is of a front engine front wheel drive type.

4. A double link type suspension system as claimed in claim 1, wherein the vehicle is a four wheel drive type.

5. A double link type suspension system as claimed in claim 1, wherein said wheel has an axle shaft connected through a constant velocity joint to a drive shaft which is driven by an engine, said axle shaft being rotatably journalled by said knuckle.

6. A double link type suspension system as claimed in claim 1, wherein said first joint is a ball joint [whose axis is aligned with said straight line].

7. A double link type suspension system as claimed in claim 6, wherein said ball joint includes a ball stud secured to said knuckle lower section, said ball stud having an axis aligned with said straight line, and a retainer for movably supporting said ball stud, secured to said lower control arm.

8. A double link type suspension system as [calimed] *claimed* in claim 1, wherein [said knuckle upper section and said shock absorber second end section are connected by a second joint through which said straight line passes, and] said extension member second end section and said upper control arm first end section are connected by a third joint, said third joint being [separate from] *located between* a vertical plane containing a point [in a horizontal plane passing through said third joint, said straight line passing through said point, said third joint being located between said vertical plane containing said point] *which lies on said straight line* and a wheel vertical plane containing center line of said wheel and perpendicular to axis of rotation of said wheel.

9. A double link type suspension system as claimed in claim 8, wherein said straight line serves as a steering axis.

10. A double link type suspension system as claimed in claim 8, wherein said point resides in said upper control arm and separate from said third joint.

11. A double link type suspension system as claimed in claim 10, wherein said straight line intersects said wheel vertical plane at a point above a horizontal plane at which said wheel is in contact with road surface.

12. A double link type suspension system as claimed in claim 11, wherein said straight line intersects said horizontal plane at a point outside of said wheel vertical plane in a lateral direction of the vehicle body.

13. A double link type suspension system as claimed in claim 1, wherein said knuckle upper section is rotatably connected to said extension member first end section to which said shock absorber second end section is connected.

14. A double link type suspension system as claimed in claim 13, wherein said shock absorber second end section is connected through an elastomeric bushing to said extension member first end section.

15. A double link type suspension system as claimed in claim 13, wherein second joint includes a joint bracket fixedly secured to said extension member first end section, a rod member secured to said bracket, a sleeve member mounted on said rod member, means defining a through-hole in said knuckle upper section, said sleeve member being situated within said through-hole, and annular ball bearings disposed between said sleeve and said knuckle upper section.

16. A double link type suspension system as claimed in claim [1] *3*, wherein said third joint includes a rod member fixedly secured to said extension member second end section, and first and second elastomeric bushings securely mounted on said rod member and located on the opposite sides of said extension member second end section, said upper control arm first end section being mounted on said elastomeric bushings.

17. A double link type suspension system as claimed in claim 16, wherein said upper control arm first end section has first and second cylindrical portions which are respectively mounted on said first and second elastomeric bushings.

18. A double link type suspension system as claimed in claim 1, wherein said suspension member [is] *has a* generally channel-shaped *cross-section* and is disposed to [surround at least] *enclose* part [of periphery] of said shock absorber.

19. A double link type suspension system as claimed in claim 18, wherein said extension member is formed of a press-formed sheet metal and includes a generally vertically extending base plate portion located between said shock absorber and said wheel, and first and second side plate portions integral with said base portion and extending along said base portion, said base plate portion and first and second side plate portions defining an elongate space in which at least a part of said shock absorber is positioned.

20. A double link type suspension system as claimed in claim 1, wherein said straight line intersects said wheel vertical plane at a point on a horizontal plane at which said wheel is in contact with road surface.

21. A double link type suspension system as claimed in claim 8, wherein said second joint includes a support bracket to which said shock absorber second end section is fixedly secured, and first and second ball joints disposed between said support bracket and said knuckle upper section, axes of said first and second ball joints being aligned with each other and aligned with said straight line.

22. A double link type suspension system as claimed in claim 21, wherein each ball joint includes a ball stud secured to said support bracket, and a retainer [for movably supporting] *pivotally mounted on* said ball stud, *the retainer being* secured to said knuckle upper section, *and wherein the* axes of *the* ball studs of said first and second ball joints [being] *are* aligned with each other and aligned with said straight line.

23. A double link type suspension system as claimed in claim 22, wherein said support bracket has first and second flange sections which are spaced from each other so that a part of said knuckle upper section is interposed therebetween, said ball studs of said first and second ball joints being fixedly secured respectively to said first and second flange sections.

24. A double link type suspension system as claimed in claim 1, wherein said first end section of said extension member is fixedly secured to an outer tube of said shock absorber.

25. A double link type suspension system as claimed in claim 8, wherein said second joint includes a support bracket to which said shock absorber second end section is fixedly secured, a rod member secured to said support bracket, means defining a through-hole in said knuckle upper section, said rod member passing through said through-hole, and first and second annular ball bearings disposed between said support bracket and said knuckle upper section and coaxial with said rod member, said first and second annular ball bearings being separate from each other.

26. A double link type suspension system as claimed in claim 8, wherein said third joint is situated above the outer peripheral surface of said wheel.

27. A double link type suspension system as claimed in claim 8, wherein said second joint includes a support bracket to which said shock absorber second end section is fixedly secured, a rod member fixedly secured to said support bracket, a cylindrical sliding bearing mounted on said rod member, a part of said knuckle upper section being mounted on said sliding bearing.

28. A double link type suspension system as claimed in claim 27, wherein said sliding bearing is a plastic bushing.

29. A double link type suspension system as claimed in claim 8, wherein said extension member first end section is formed with a cylindrical portion fitted on an outer tube of said shock absorber.

*30. A double link type suspension as claimed in claim 1, wherein said joint means comprises:*

*a second joint which is formed on said knuckle and which provides a pivotal connection between the knuckle and the second end section of said extension member; and*

*a pivot connection which interconnects the second end section of said shock absorber and the second end section of said extension member at a location proximate said second joint.*

*31. A double link suspension system for a vehicle, comprising:*

*a knuckle on which a road wheel is rotatably supportable;*

*a first joint;*

*a lower control arm having an outboard section pivotally connected to a lower section of said knuckle by said first joint, and an inboard end section adapted for pivotal connection to a vehicle body;*

*a shock absorber, said shock absorber having a connection member adapted for connection to the vehicle body;*

*an upper control arm having an inboard end and an outboard end, the inboard end being adapted for pivotal connection to said vehicle body;*

*an extension member having a first end and a second end, the first end being pivotally connected to the outboard end of the upper arm, the second end being connected to said shock absorber; and*

*a second joint, said second joint pivotally connecting an upper section of said knuckle to one of said shock absorber and the second end of said extension member, said first and second joints being arranged such that said knuckle is pivotal with respect to said extension member about an axis which passes through the first and second joints.*

*32. A double link suspension system for a vehicle, comprising:*

*a knuckle on which a road wheel is rotatably supportable;*

*a lower control arm having an outboard section which is pivotally connected to a lower section of said knuckle by a first joint, and an inboard end section which is adapted for pivotal connection to a vehicle body;*

*an extension member having an upper end and a lower end, the lower end being pivotally connected to said knuckle by a second joint, the first and second joints being arranged such that said knuckle is pivotal about an axis which passes through the first and second joints;*

*an upper control arm having an outboard end which is pivotally connected to the upper end section of said extension member, and an inboard end section which is adapted for pivotal connection to said vehicle body; and*

*a shock absorber having an upper end which is adapted for connection to the vehicle body, and a lower end which is pivotally connected to the lower end section of said extension member.*

*33. A double link suspension system for a vehicle, comprising:*

*a knuckle on which a road wheel is rotatably supportable;*

*a lower control arm having an outboard end which is pivotally connected to a lower section of said knuckle by a first joint, and an inboard end which is adapted for pivotal connection to a vehicle body;*

*a shock absorber having an upper end which is adapted for connection to the vehicle body, and a lower end section operatively connected to an upper section of said knuckle by a second joint in such a manner that said knuckle is relatively rotatably with respect to said shock absorber about a straight line passing through said first joint and said second joint;*

*an extension member having first end and a second end, the first end being rigidly connected to said shock absorber; and*

*an upper control arm having an outboard end which is pivotally connected to the second end of said extension member, and an inboard end which is adapted for pivotal connection to said vehicle body.*

*34. A double link suspension system for a vehicle, comprising:*

*a knuckle;*

*means for rotatably supporting a road wheel on said knuckle;*

*means defining a first joint on a lower portion of said knuckle;*

*means defining a second joint on an upper portion of said knuckle;*

*a lower control arm having an outboard section which is pivotally connected to the lower section of said knuckle by said first joint, and an inboard end section which includes means for pivotally connecting the inboard end to a vehicle body;*

*an extension member having an upper end and a lower end, the lower end being pivotally connected to said knuckle by said second joint, the first and second joints being arranged such that said knuckle is pivotal with respect to said lower control arm and said extension about an axis which passes through the first and second joints;*

*an upper control arm having an outboard end which is pivotally connected to the upper end section of said extension member, and an inboard end section including means for pivotally connecting the inboard end to a vehicle body; and*

*a shock absorber having an upper end which includes means for connecting the upper end to a vehicle body, and a lower end which is pivotally connected to the lower end section of said extension member.*

*35. A double link suspension as claimed in claim 34 wherein said extension member has a channel shaped cross-section and said shock absorber is disposed in such a manner as to be partially enclosed by said extension member.*

* * * * *